(12) United States Patent
Sjöberg et al.

(10) Patent No.: US 12,262,042 B2
(45) Date of Patent: *Mar. 25, 2025

(54) ENCODER, DECODER AND METHODS THEREOF FOR VIDEO ENCODING AND DECODING

(71) Applicant: Telefonaktiebolaget LM Ericsson (publ), Stockholm (SE)

(72) Inventors: Rickard Sjöberg, Stockholm (SE); Jonatan Samuelsson, Stockholm (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 18/219,221

(22) Filed: Jul. 7, 2023

(65) Prior Publication Data

US 2023/0362400 A1 Nov. 9, 2023

Related U.S. Application Data

(63) Continuation of application No. 17/856,511, filed on Jul. 1, 2022, now Pat. No. 11,736,711, which is a
(Continued)

(51) Int. Cl.
 *H04N 19/70* (2014.01)
 *H04N 19/44* (2014.01)
 (Continued)

(52) U.S. Cl.
 CPC ............ *H04N 19/50* (2014.11); *H04N 19/44* (2014.11); *H04N 19/46* (2014.11); *H04N 19/58* (2014.11); *H04N 19/70* (2014.11); *H04N 19/89* (2014.11)

(58) Field of Classification Search
 CPC .............................. H04N 19/70; H04N 19/63
 (Continued)

(56) References Cited

U.S. PATENT DOCUMENTS 11,284,106 B2* 3/2022 Samuelsson ......... H04N 19/176
2006/0056706 A1* 3/2006 Marcellin .............. H04N 19/66
 375/E7.029
(Continued)

FOREIGN PATENT DOCUMENTS

WO 2013082471 A1 6/2013

OTHER PUBLICATIONS

AHG21: Comments on Signaling of Reference Pictures (Year: 2012).*
(Continued)

*Primary Examiner* — Albert Kir
(74) *Attorney, Agent, or Firm* — Murphy, Bilak & Homiller, PLLC (57) ABSTRACT

According to an embodiment, an encoder is configured to ensure that for each long-term picture of a RPS of a picture i the value of a flag referred to as delta_poc_msb_present_flag[i] is equal to 1 when there are at least two reference pictures in a decoded picture buffer with lsb's of the POC referred to as pic_order_cnt_lsb equal to the lsb's of the respective long-term picture i denoted POC lsbLt[i]. When the delta_poc_msb_present_flag is equal to 1, the long-term picture is indicated by the full POC.

20 Claims, 7 Drawing Sheets

Related U.S. Application Data continuation of application No. 15/804,774, filed on Nov. 6, 2017, now Pat. No. 11,412,245, which is a continuation of application No. 14/394,497, filed as application No. PCT/SE2013/050416 on Apr. 16, 2013, now Pat. No. 9,838,706.

(60) Provisional application No. 61/624,469, filed on Apr. 16, 2012.

(51) Int. Cl.
*H04N 19/46* (2014.01)
*H04N 19/50* (2014.01)
*H04N 19/58* (2014.01)
*H04N 19/89* (2014.01)

(58) Field of Classification Search
USPC .................................. 375/240.13; 382/232
See application file for complete search history.

(56) References Cited

U.S. PATENT DOCUMENTS

| | | | | |
|---|---|---|---|---|
| 2013/0077687 | A1* | 3/2013 | Wang | H04N 19/174 375/E7.243 |
| 2013/0089134 | A1* | 4/2013 | Wang | H04N 19/423 375/E7.026 |
| 2013/0188709 | A1* | 7/2013 | Deshpande | H04N 19/105 375/E7.02 |
| 2015/0103881 | A1* | 4/2015 | Hendry | H04N 19/46 375/240.02 |
| 2015/0264366 | A1* | 9/2015 | Hendry | H04N 19/597 375/240.01 |
| 2022/0303549 | A1* | 9/2022 | Hendry | H04N 19/70 |

OTHER PUBLICATIONS

Boyce, Jill , "BoG report on Decoded picture buffering and reference picture signaling", Joint Collaborative Team on Video Coding (JCT-VC) of ITU-T SG16 WP3 and ISO/IEC JTC1/SC29/WG11; Document: JCTVC-H0715, 8th Meeting, San Jose, CA, Feb. 1-10, 2012, 1-10.

Chiariglione, Leonardo , "Report of 99th Meeting", International Organisation for Standardisation Organisation Internationale de Normalisation ISO/IEC JTC 1/SC 29/WG 11 Coding of Moving Pictures and Audio N12454 San Jose, CA, US, Feb. 2012, 1-429.

Deshpande, Sachin , et al., "AHG21: Comments on Signaling of Reference Pictures", Joint Collaborative Team on Video Coding (JCT-VC) of ITU-T SG16 WP3 and ISO/IEC JTC1/SC29/WG11, Document: JCTVC-H053I, WG11 No. m23412, 8th Meeting, San Jose, CA, Feb. 1-10, 2012, 1-6.

Hendry , et al., "AHG21: Comment on Signaling of Long-term Reference Pictures", Joint Collaborative Team on Video Coding (JCT-VC) of ITU-T SG16 WP3 and ISO/IEC JTC1/SC29/WG11, Document: JCTVC-H0200, 8th Meeting, San José, CA, Feb. 1-10, 2012, 1-4.

Ramasubramonian, Adarsh K., et al., "AHG13: On signalling of MSB cycle for long-term reference pictures", Joint Collaborative Team on Video Coding (JCT-VC) of ITU-T SG 16 WP 3 and ISO/IEC JTC 1/SC 29/WG 11, Document: JCTVC-J0118, 10th Meeting, Stockholm, SE, Jul. 11-20, 2012, 1-6.

Samuelsson, Jonatan , et al., "Single inclusion of long-term reference pictures in RPS", Joint Collaborative Team on Video Coding (JCT-VC) of ITU-T SG 16 WP 3 and ISO/IEC JTC 1/SC 29/WG 11, Document: JCTYC-K0235, 26567, 11th Meeting, Shanghai, CN, Oct. 10-19, 2012, 1-4.

Sjoberg, Rickard , "Absolute signaling of reference pictures", Joint Collaborative Team on Video Coding (JCT-VC) of ITU-T SG16 WP3 and ISO/IEC JTC1/SC29/WG11, Document: JCTVC-F493, WG11 No. m20923, 6th Meeting, Torino, 2011, 1-10.

Wahadaniah, Victor , et al., "AHG2I: Construction and modification of predefined reference picture sets and reference picture lists", Joint Collaborative Team on Video Coding (JCT-VC) of ITU-T SG16 WP3 and ISO/IEC JTC1/ SC29/WG11, Document: JCTVC-G548, 7th Meeting, Geneva, CH, Nov. 21-30, 2011, 1-22.

\* cited by examiner

ENCODER, DECODER AND METHODS THEREOF FOR VIDEO ENCODING AND DECODING

TECHNICAL FIELD

The embodiments described herein relate to an encoder, a decoder, methods thereof, computer programs, and computer program products for reference picture handling in video coding.

BACKGROUND

High Efficiency Video Coding (HEVC) is a video coding standard currently being developed in Joint Collaborative Team-Video Coding (JCT-VC). JCT-VC is a collaborative project between Moving Picture Experts Group (MPEG) and International Telecommunication Union-Telecommunication Standardization Sector (ITU-T). Currently, an HEVC Model (HM) is defined that includes a number of tools and is considerably more efficient than H.264/Advanced Video Coding (AVC).

A picture coded/decoded according to HEVC is partitioned into one or more slices, where each slice is an independently decodable segment of the picture. This means that if a slice is missing, for instance got lost during transmission, the other slices of that picture can still be decoded correctly. In order to make slices independent, they are self contained and do not depend on each other which imply that no bitstream element of another slice is required for decoding any element of a given slice.

Each slice contains a slice header which independently provides data for the slice to be independently decodable. One example of a data element present in the slice header is the slice address, which is used for the decoder to know the spatial location of the slice. There are many more data elements in the slice header.

HEVC uses reference pictures for inter prediction for decoding. The reference pictures are previously decoded pictures to be used for decoding of a current picture. The decoder has a decoded picture buffer (DPB), which contains previously decoded pictures that are stored by the decoder. The main reason for a previously decoded picture to be stored in the DPB is in order for the decoder to use the picture for inter prediction. The DPB size is limited and the encoder decides what pictures to store; each slice header contains that information. A reference picture in HEVC is a picture in the DPB that is available for reference by being indicated as used for reference. There may also be pictures in the DPB that are marked unused for reference, these pictures are not available for reference and are thereby not reference pictures. The reference pictures in the DPB are either marked as used for short-term reference pictures or used for long-term reference pictures. Short-term pictures are typically kept for a shorter while compared to long-term pictures in the DPB. Another difference between the short term and the long-term pictures is e.g. motion vector scaling, where motion vectors from long-term pictures are not scaled by the POC distance but short-term picture motion vectors are.

Therefore, the HEVC standard includes a picture marking process in which reference pictures can be marked as "used for short-term reference", "used for long-term reference" and "unused for reference". If marked as "unused for reference", a reference picture is turned into a non-reference picture and can not be used for prediction any more.

The reference picture marking process in HEVC is controlled by reference picture sets (RPSs). An RPS is a set of picture identifiers that indicates the pictures that are allowed to be used as reference pictures. The RPS is sent from the encoder to the decoder in each slice header and reference pictures that are indicated in the RPS will be kept in the decoded picture buffer (DPB) which stores the decoded pictures in the decoder. RPS slice header syntax of the long-term picture is shown in table 1 below.

There are various alternatives available that could be used as picture identifier. For instance, the picture identifier could be the decoding order number, the display order number, the output order number or a combination of display order number and an additional identifier or indeed any other information that can be used to unambiguously identify the picture. An example of such a picture identifier is the Picture Order Count (POC).

POC is used in HEVC to indicate reference pictures in the RPS and also to define the output order (or display order) of pictures. Each slice contains a POC code word, pic_order_cnt_lsb, that shall be the same for all slices of a picture. pic_order_cnt_lsb is also known as the least significant bits (lsb) of the full POC since is it a fixed-length code word and only the least significant bits of the full POC is signaled. Short-term pictures are indicated in the RPS through a pair of numbers: the POC of the reference picture and a flag: used_by_curr_pic_lx_flag. The decoder knows the POC of the reference pictures in the DPB and can match those against the POC values received in the RPS. The flag used_by_curr_pic_lx_flag indicates whether the reference picture is used for reference for the current picture or not. If the flag indicates that a picture P is not used for reference for the current picture, picture P is still kept in the DPB, but the usage of picture P as a reference picture for the current picture is prohibited. It may well be the case that picture P is used as a reference picture for a future picture however. Further, the POCs indicated in the RPS can be represented by delta POCs relative to the POC of the current picture, wherein the POC of the current picture is known. To determine the POC, the decoder has to decode the syntax elements with the delta POC and add their values with the POC of the current picture.

Long-term pictures are generally indicated in the RPS by the least significant bit (lsb) part of the POC value of respective long-term picture. However, the HEVC standard has an optional syntax element, delta_poc_msbscycle_lt_minus1, which provides an alternative way of referencing long-term pictures. The long-term picture part of the HEVC slice header syntax is shown in Table 1.

TABLE 1

RPS slice header syntax for long-term pictures

|  | Descriptor |
|---|---|
| slice_header( ) { | |
| ... | |
| if( long_term_ref_pics_present_flag ) { | |
|   num_long_term_pics | ue(v) |
|   for( i = 0; i < num_long_term_pics; i++ ) { | |
|     delta_poc_lsb_lt[ i ] | ue(v) |
|     delta_poc_msb_present_flag[ i ] | u(1) |
|     if( delta_poc_msb_present_flag[ i ] ) | |
|       delta_poc_msb_cycle_lt_minus1[ i ] | ue(v) |
|     used_by_curr_pic_lt_flag[ i ] | u(1) |
|   } | |
| } | |
| ... | |
| } | |

If delta_poc_msb_present_flag is equal to 0, the long-term picture is indicated by the lsb part of its POC. If delta_poc_msb_present_flag is equal to 1, the long-term picture is indicated by the full POC. delta_poc_msb_present_flag equal to 1 allows for two long-term pictures to share the same POC lsb. The syntax element, delta_poc_msb_sycle_lt_minus1 will be present when delta_poc_msb_present_flag is equal to 1. The existing HEVC standard mandates that delta_poc_msb_present_flag shall be equal to 1 for every long-term picture in the RPS that has identical POC lsb to another long-term picture in the RPS.

SUMMARY

Consider the following example which describes a problem associated with the above described prior art:

Assume that 8 bits are used for pic_order_cnt_lsb. This means that POC lsb values are in the range of 0 to 255, inclusive. The POC of the current picture is 257 and pictures with POC 0 and 256 are both long-term pictures. According to the existing HEVC standard and the restriction, delta_poc_msb_present_flag[i] shall be equal to 1 when DeltaPocLt[i] is equal to DeltaPocLt[j] for any value of j in the range of 0 to num_long_term_pics−1, inclusive, and not being equal to i. Note that DeltaPocLt indicates the POC value of the long-term reference pictures by using the POC of the current picture and adding the delta POC value.

Both long-term picture 0 and long-term picture 256 are signalled like this, with the syntax from Table 1, if they are both used for reference for the current picture:

num_long_term_pics=2
delta_poc_lsb_lt[0]=1
delta_poc_msb_present_flag[0]=1
delta_poc_msb_cycle_lt_minus1 [0]=0
used_by_curr_pic_lt_flag[0]=1
delta_poc_lsb_lt[1]=0
delta_poc_msb_present_flag[1]=1
delta_poc_msb_cycle_lt_minus1 [1]=1
used_by_curr_pic_lt_flag[1]=1

Note that both delta_poc_msb_present_flag[0] and delta_poc_msb_present_flag[1] has to be equal to 1 according to the restriction above since they share the same POC lsb.

Assume that the next picture has POC 258 and that one of the long-term pictures is kept. If delta_poc_msb_present_flag is not set, i.e. equal to 0, it is not defined which picture to keep and which picture to remove since they share the same POC lsb and POC lsb is what is used for indicating the picture.

Another problem with delta_poc_msb_present_flag equal to 0 is error resilience where it becomes ambiguous what picture should be present in the DPB in case of picture losses. Assume that the picture with POC 258 in the example above is lost and that the next picture (with POC 259) indicates that the one long-term picture should still be used for reference. If picture 259 uses delta_poc_msb_present_flag equal 0 for this single long-term picture, it is again not clear which picture of the two that should be used for reference and which that should not.

Thus, a problem with the current HEVC design is that two long-term pictures having identical POC values stored in the DPB, can cause unambiguously interpretation of which pictures to be used as reference pictures.

According to a first aspect of embodiments of the present invention, a method performed by an encoder for encoding a current picture of a video stream is provided. Previously decoded pictures are used as reference pictures for decoding and the encoder indicates in an RPS, to a decoder, which previously decoded pictures that are indicated as reference pictures in a DPB wherein the RPS indicates the reference pictures by a respective POC value. In the method, it is determined for each long-term picture indication i of the RPS of the current picture if there are at least two reference pictures in the DPB of a decoder with POC lsb equal to POC lsb of said long-term picture indication i. If it is determined that there are at least two reference pictures in the DPB with POC lsb equal to the POC lsb indicated for said long-term picture indication i in the RPS, a parameter indicative of that the long-term picture indication i should use the full POC is set, and the current picture and the RPS with said parameter are sent to the decoder.

According to a second aspect, a method performed by a decoder for decoding a current picture of a video stream is provided. Previously decoded pictures are used as reference pictures for decoding and the decoder receives an indication in an RPS from an encoder, which previously decoded pictures that are indicated as reference pictures in a DPB wherein the RPS indicates the reference pictures by a POC value. In the method, the current picture and the RPS for the current picture are received. Further, a parameter is received which is indicative of for each long-term picture indication i in the RPS whether the long-term picture should be indicated by the full POC or by the lsb of the POC. A first condition if the received parameter indicates that the long-term picture indication i should be indicated by the lsb of the POC is checked, and a second condition if there are at least two reference pictures in the decoded picture buffer of a decoder with lsb of the POC equal to POC lsb of a long-term picture indication i of the RPS of the current picture is checked. If both the first and the second conditions are fulfilled, it is determined that the video stream is erroneous.

According to a third aspect, an encoder for encoding a current picture of a video stream is provided. The encoder is adapted to use previously decoded pictures as reference pictures for encoding and the encoder is adapted to indicate in an RPS to a decoder, which previously decoded pictures that are indicated as reference pictures in a DPB wherein the encoder is configured to indicate the reference pictures in the RPS by a POC value. The encoder comprises a unit for determining for each long-term picture indication i of the RPS of the current picture if there are at least two reference pictures in the DPB of decoder with POC lsb equal to POC lsb of said long-term picture indication i. The encoder further comprises a unit for setting a parameter indicative of that the long-term picture indication i should use the full POC if it is determined that there is at least two reference pictures in the DPB with POC lsb equal to the POC lsb indicated for said long-term picture indication i in the RPS, and an output unit configured to send the current picture and the RPS with said parameter to the decoder.

According to a fourth aspect, a decoder for decoding a current picture of a video stream is provided. The decoder is configured to use previously decoded pictures as reference pictures for decoding and the decoder comprises an input unit for receiving an indication in a RPS from an encoder, which previously decoded pictures that are indicated as reference pictures in a DPB. The RPS is indicative of the reference pictures by a POC value. The input unit is further configured to receive the current picture and the RPS for the current picture, to receive a parameter indicative of for each long-term picture indication i in the RPS whether the long-term picture should be indicated by the full POC or by the lsb of the POC. The decoder further comprises a checking unit for checking a first condition if the received parameter indicates that the long-term picture indication i should be indicated by the lsb of the POC (POC lsb) and for checking a second condition if there are at least two reference pictures in the decoded picture buffer of a decoder with POC lsb equal to POC lsb of a long-term picture indication i of the RPS of the current picture, and a unit for determining that the video stream is erroneous if both the first and the second conditions are fulfilled.

According to a fifth aspect, a computer program for encoding a current picture of a video stream is provided. Previously decoded pictures are used as reference pictures for decoding and the encoder indicates in a RPS to a decoder which previously decoded pictures that are indicated as reference pictures in a DPB. The RPS indicates the reference pictures by a respective POC value. Said computer program comprises code means which when run on a processor causes said processor to:

determine for each long-term picture indication i of the RPS of the current picture if there are at least two reference pictures in the DPB of a decoder with least significant bits of the POC, POC lsb, equal to POC lsb of said long-term picture indication i, and if it is determined that there is at least two reference pictures in the DPB with POC lsb equal to the POC lsb indicated for said long-term picture indication i in the RPS,     set a parameter indicative of that the long-term picture indication i should use the full POC, and     send the current picture and the RPS with said parameter to the decoder.

According to a sixth aspect, a computer program product is provided. The computer program product comprises computer readable code means and a computer program according to the fifth aspect stored on said computer readable code means.

According to a seventh aspect, a computer program for decoding a current picture of a video stream is provided. Previously decoded pictures are used as reference pictures for decoding and the decoder receives an indication in a RPS from an encoder, which previously decoded pictures that are indicated as reference pictures in a DPB wherein the RPS indicates the reference pictures by a POC value. Said computer program comprises code means which when run on a processor causes said processor to:

receive the current picture and the RPS for the current picture,     receive a parameter indicative of for each long-term picture indication i in the RPS whether the long-term picture should be indicated by the full POC or by the least significant bits, lsb, of the POC,     check a first condition if the received parameter indicates that the long-term picture indication i should be indicated by the lsb of the POC,     check a second condition if there are at least two reference pictures in the decoded picture buffer of a decoder with lsb of the POC, POC lsb, equal to POC lsb of a long-term picture indication i of the RPS of the current picture,     if both the first and the second conditions are fulfilled: determine that the video stream is erroneous.

According to an eighth aspect, a computer program product is provided. The computer program product comprises computer readable code means and a computer program according to the seventh aspect stored on said computer readable code means.

An advantage with embodiments of the present invention is that the encoder and the decoder can unambiguously determine which pictures in the DPB that are allowed to be used as reference pictures. Another advantage is that that it is possible to detect erroneous bitstreams by using some embodiments.

DETAILED DESCRIPTION

Throughout the drawings, the same reference numbers are used for similar or corresponding elements.

The present embodiments generally relate to video encoding and decoding, and in particular to reference picture handling in video encoding and decoding.

Figure 1:
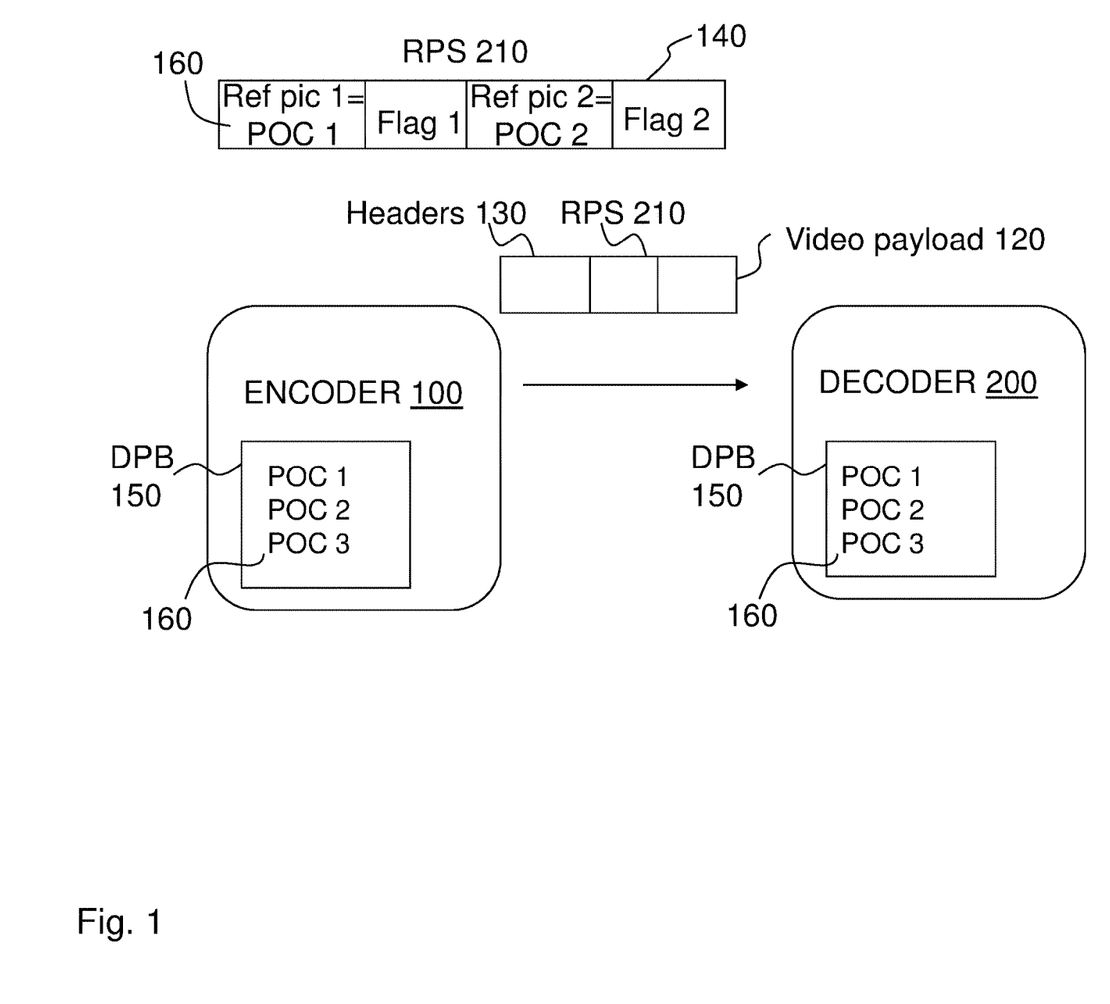
FIG. 1 illustrates schematically reference picture handling according to prior art.

FIG. 1 explains the handling of long term reference pictures in a reference picture set (RPS) 210 according to prior art. The RPS 210 indicates which pictures in the Decoded Picture Buffer (DPB) 150 to be kept, which are allowed to be used as reference pictures. The RPS 210 also comprises information whether the reference pictures should be used as short-term reference pictures or long-term reference pictures (not shown). The reference pictures are distinguished by their respective POC values 160. It should be noted that the reference pictures are used for both encoding and decoding the picture and the encoder 100 comprises a DBP 150 which is a copy of the DPB 150 of the decoder 200. The Reference Picture Set (RPS) 210 comprising the indication of the reference pictures to be kept in the DPB 150 is signalled from the encoder 100 to the decoder 200 in the bitstream. The bitstream comprises also the actual video payload 120 and headers 130 with other control information. The RPS can be signalled in the slice header. The RPS 210 comprises at least a syntax element, e.g. a flag, denoted flag1, flag2, 140 for each long-term reference picture in addition to the indication of the long-term reference pictures. The flag may be denoted delta_poc_msb_present_flag. If the syntax element e.g. referred to as delta_poc_msb_present_flag is equal to 0, the long-term picture is indicated by the lsb part of its POC. If the syntax element, e.g. referred to as delta_poc_msb_present_flag is equal to 1, the long-term picture is indicated by the full POC. The POC of the current picture is sent for each picture, therefore the reference pictures can be identified by a delta POC, wherein the delta POC is relative to the POC of the current picture.

As stated above, if the syntax element, e.g. the flag 140 is zero, the lsb part of the POC is signalled. This means that the decoder will not be able to distinguish between pictures that share the same POC lsb. Assume that max_poc is 100 and the current POC is 1000. If the signalled lsb part of the POC for a long-term picture is 0, long-term pictures with POC values of 900, 800, 700, 600, etc will match and thus the receiver may not be able to deduce which picture that were indicated.

In accordance with embodiments of the present invention, if there is more than one picture with the same POC lsb in the DPB, the full POC must be signalled in order to be able to unambiguously identify the pictures in the DPB. The full POC can be indicated by providing an additional codeword 170, such as delta_poc_msb_cycle_lt_minus1, which indicates how many cycles away the long-term picture is. If the number of cycles is 2, the POC is 800 and nothing else. If the lsb part of POC is used for a reference picture, this additional codeword 170 is not sent for that reference picture.

According to one embodiment, it is a requirement of bitstream conformance that the value of the syntax element 140 denoted delta_poc_msb_present_flag[i] shall be equal to 1 when there is at least two reference pictures in the DPB with pic_order_cnt_lsb equal to DeltaPocLt[i], where DeltaPocLt is a list that indicates all POC lsb of the long-term pictures in the RPS. Thus DeltaPocLt[i] can also be denoted POClsbLt[i] for a picture i. As mentioned above, the POC of the current picture is known and POC values of other pictures are indicated by a delta POC compared to the current picture.

Thus, according to one aspect of one embodiment, a method performed by an encoder for encoding a current picture of a video stream is provided. The method is illustrated in a flowchart of FIG. 2a. The previously decoded pictures are used as reference pictures for decoding and the encoder indicates in a RPS to a decoder, which previously decoded pictures that are indicated as reference pictures in a decoded picture buffer, wherein the RPS indicates the reference pictures by POC values. The reference picture indication can be a long-term picture indication or a short-term picture indication. In the method, it is determined 251 for each long-term picture indication i 175 of the RPS of the current picture if there are at least two reference pictures in the decoded picture buffer of a decoder with POC lsb equal to POC lsb of said long-term picture indication i. If it is determined 252 that there is at least two reference pictures in the DPB with POC lsb equal to the POC lsb for said long-term picture indication i in the RPS, a parameter (also referred to as a syntax element) indicative of whether the long-term picture indication i should be indicated by the full POC or the lsb of the full POC is set 253 to indicate that full POC should be used, and the RPS of the current picture with said parameter is sent 254 to the decoder, It should be noted that the additional codeword 170 (see FIG. 3), such as delta_poc_msb_cycle_lt_minus1, which indicates how many cycles away the long-term picture is can be sent in addition to said parameter such that the full POC can be indicated. As an optional further step (not shown), information from which the full poc can be determined may be sent for those pictures for which delta_poc_msb_present_flag is equal to 1.

Figure 2A:
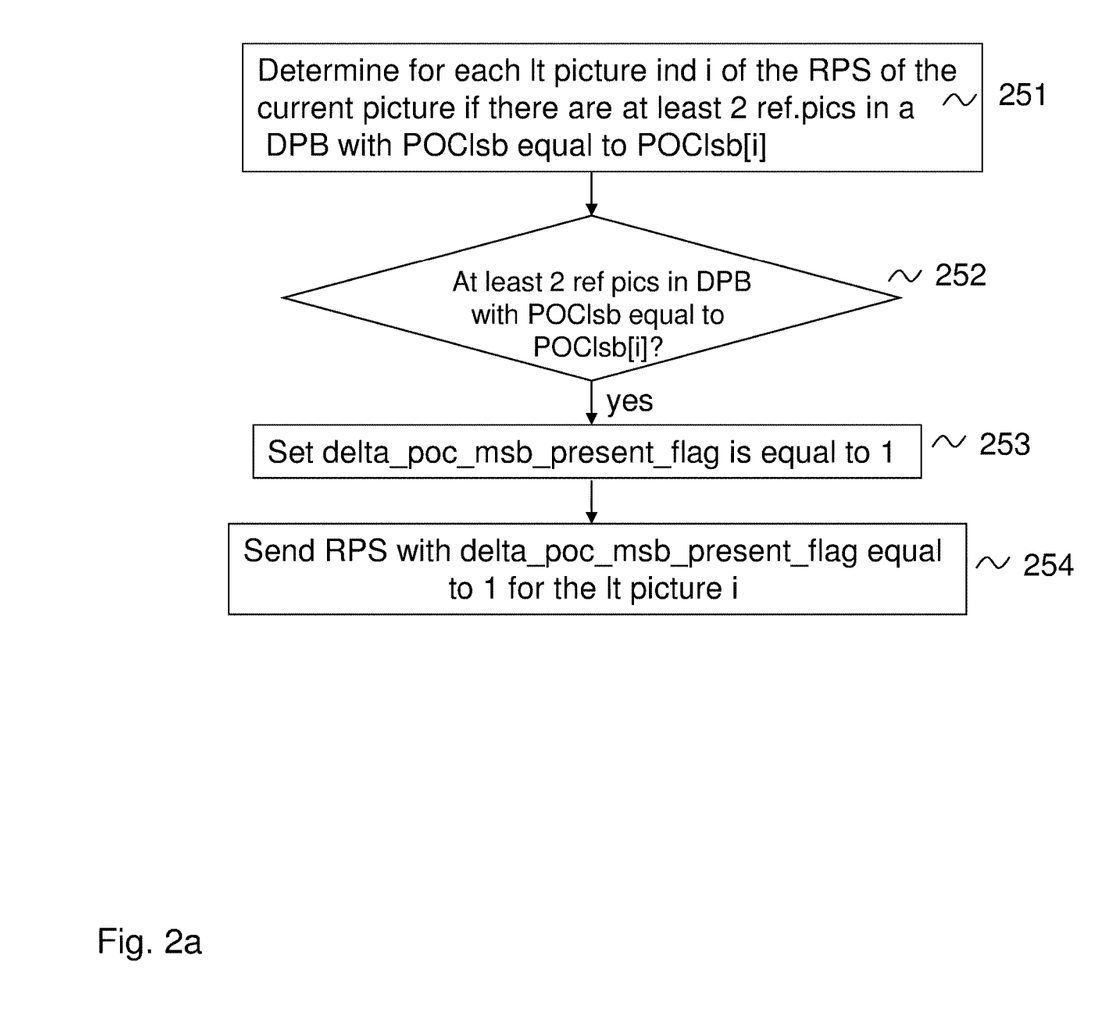
FIG. 2a-2b are flowcharts illustrating methods according to embodiments of the present invention.
Figure 2B:
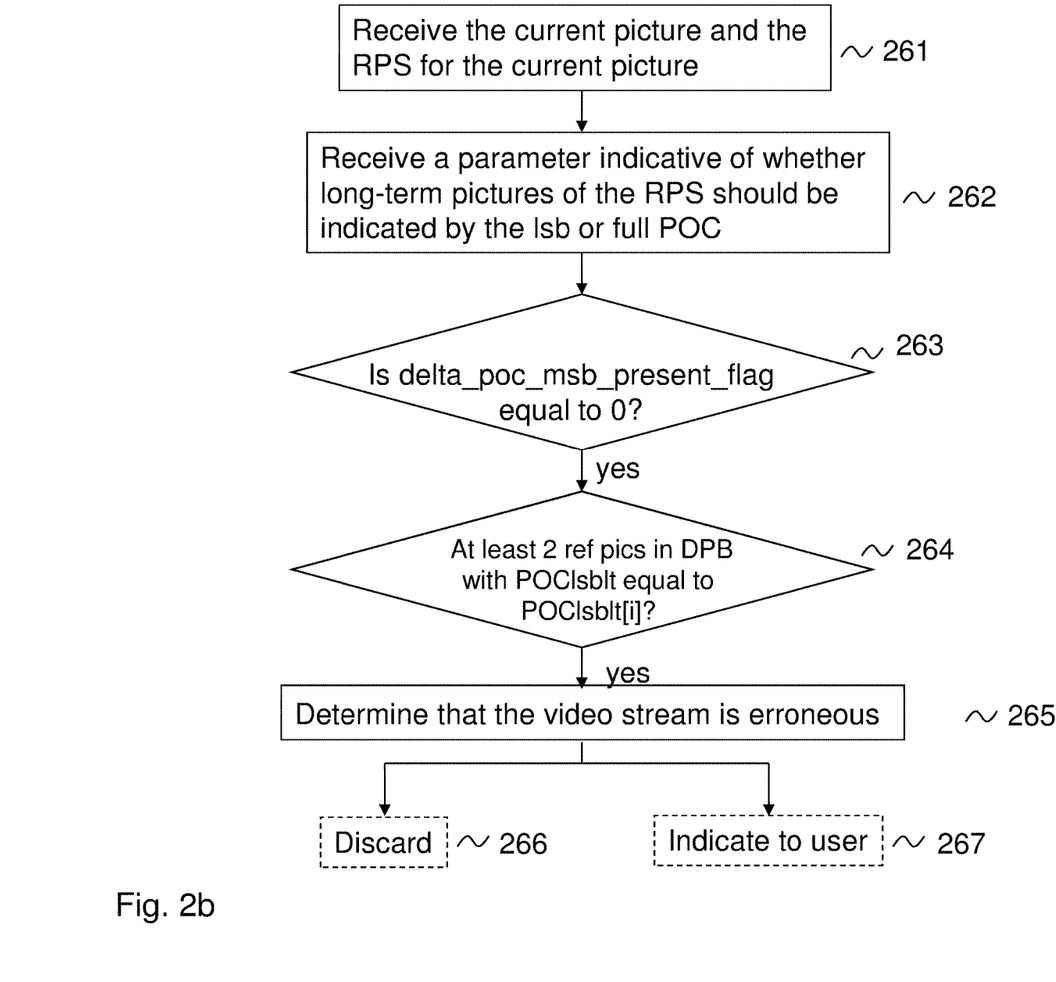

According to another aspect, a method performed by a decoder of decoding a current picture i of a video stream is provided as illustrated in FIG. 2b. Previously decoded pictures are used as reference pictures for decoding and the decoder receives an indication in a RPS from an encoder, which previously decoded pictures that are indicated as reference pictures in a decoded picture buffer. The RPS indicates the reference pictures by POC values. The reference picture indication can be a long-term picture indication or a short-term picture indication. In the method, the current picture and the RPS for the current picture are received 261. Further, a parameter indicative of whether the respective long-term picture indication i of the RPS should be indicated by the full POC or by the lsb of the POC is received 262. A first condition if the received parameter indicates that the long-term picture indication i should be indicated by the lsb of the full POC is checked 263 and then a second condition if there are at least two reference pictures in the decoded picture buffer of a decoder with POC lsb equal to POC lsb of said long-term picture indication i is checked 264. If both the first and the second conditions are fulfilled, it is determined 265 that the video stream is erroneous. If the video stream is erroneous, e.g. not HEVC compliant, the current picture can be discarded. The decoder can be located in a test arrangement, in that case an indication to a user can be provided that the video stream is erroneous and the reason why the stream is erroneous is because it violates the constraint"

According to embodiments, the parameter indicative of that the long-term picture should be indicated by the full POC is a flag, e.g. denoted delta_poc_msb_present_flag[i].

In a further embodiment, a restriction is imposed by the encoder such that a long-term picture that has been signaled with the parameter indicative of that the long-term picture should be indicated by the full POC will never be signaled with the parameter indicative of that the long-term picture should be indicated by the lsb:s of the POC in the future.

According to an embodiment, the encoder is configured to ensure that for each long-term picture of a RPS of a picture i the value of a flag referred to as delta_poc_msb_present_flag[i] is equal to 1 when there is at least two reference pictures in a decoded picture buffer with lsb:s of the POC referred to as pic_order_cnt_lsb equal to the lsb:s of the respective long-term picture i denoted POC lsbLt[i]. When the delta_poc_msb_present_flag is equal to 1, the long-term picture is indicated by the full POC. When there is not at least two reference pictures in the DPB with lsb:s of the POC referred equal to the lsb:s of the respective long-term picture i, the encoder is free to set the syntax element e.g. denoted delta_poc_msb_present_flag to either 1 or 0.

Figure 3:
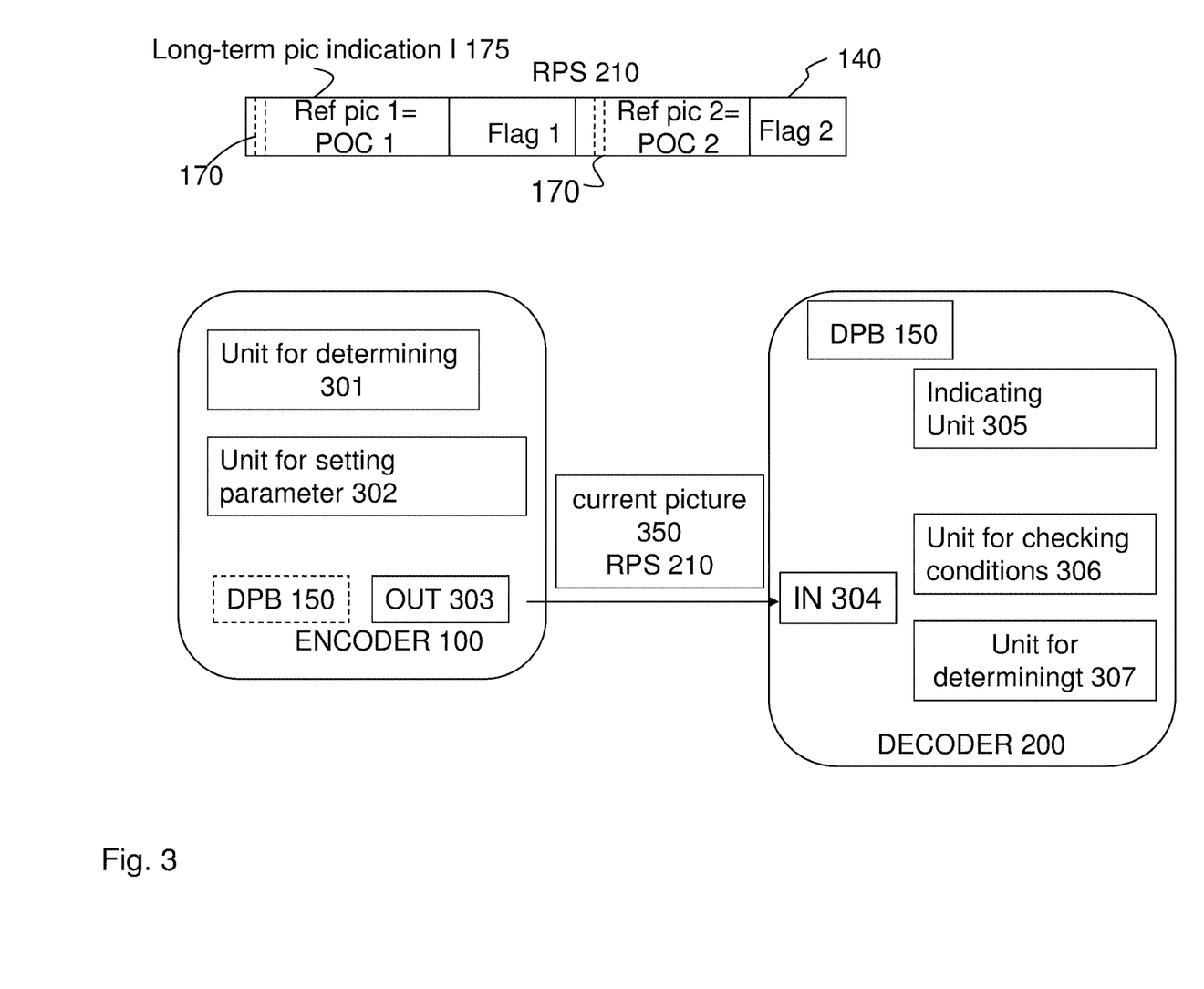
FIG. 3 illustrates an encoder and a decoder according to an embodiment of the present invention.

In this way, the ambiguity caused by the current HEVC design allowing that two long-term pictures having identical POC values can be stored in the DPB, can be avoided. It should be noted that when a picture is about to be decoded, the DPB contains the previous picture plus the pictures indicated in the RPS of the previous picture. As illustrated in FIG. 3, the encoder also comprises a DPB which is a copy of the DPB of the decoder. In this way, the encoder is aware of the content of the DPB of the decoder.

Hence an encoder according to an embodiment is provided, comprising a unit 301 configured to determine for each long-term picture i of a RPS of a picture P if there is at least two reference pictures in a DPB of a decoder with pic_order_cnt_lsb equal to POC lsbLt[i], i.e. the POC lsb of the long-term picture indication i, as indicated in the RPS, and if it is determined that there is at least two reference pictures in the DPB with pic_order_cnt_lsb equal to POC lsbLt[i], the unit 302 is configured to set a parameter delta_poc_msb_present_flag[i] equal to 1, and the encoder comprises an output unit 303 configured to send the parameter delta_poc_msb_present_flag[i].

Thus, according to a further aspect an encoder 100 for encoding a current picture of a video stream is provided as illustrated in FIG. 3. The encoder is adapted to use previously decoded pictures as reference pictures for encoding and the encoder is adapted to indicate in a RPS 210 to a decoder 200, which previously decoded pictures that are indicated as reference pictures in the DPB 150. Furthermore, the encoder is 100 configured to indicate the reference pictures in the RPS 210 by POC values. The reference picture indication can be a long-term picture indication or a short-term picture indication. The encoder comprises a unit 301 for determining for each long-term picture indication i 175 of the RPS of the current picture if there are at least two reference pictures in the DPB of decoder with least significant bits of the POC (denoted POC lsb) equal to POC lsb of said long-term picture indication i 175, a unit 302 for setting a parameter indicative of that the long-term picture indication i should use the full POC if it is determined that there is at least two reference pictures in the DPB with POC lsb equal to the POC lsb indicated for said long-term picture indication i in the RPS 210, and an output unit 303 configured to send the current picture and the RPS with said parameter to the decoder 200. According to an embodiment, the unit 301 for determining further is configured to impose a restriction such that a long-term picture indication i that has been signaled with the parameter indicative of that the long-term picture indication i should be indicated by the full POC will never be signaled with the parameter indicative of that the long-term picture indication i should be indicated by the lsb:s of the POC in the future.

The encoder may be an HEVC encoder.

With further reference to FIG. 3, a decoder 200 for decoding a current picture of a video stream is provided according to a further aspect of the present invention. The decoder is configured to use previously decoded pictures as reference pictures for decoding. The decoder comprises an input unit 304 for receiving an indication in a RPS from an encoder which previously decoded pictures that are indicated as reference pictures in the DPB. The RPS is indicative of the reference pictures by POC values. The input unit 304 is further configured to receive the current picture and the RPS for the current picture, to receive a parameter indicative of for each long-term picture indication i in the RPS whether the long-term picture should be indicated by the full POC or by the lsb:s of the POC. The decoder further comprises a checking unit 306 for checking a first condition if the received parameter indicates that the long-term picture indication i 175 should be indicated by the lsb of the POC and for checking a second condition if there are at least two reference pictures in the decoded picture buffer of a decoder with lsb of the POC (denoted POC lsb) equal to POC lsb of a long-term picture indication i 175 of the RPS of the current picture, and a unit for determining 307 that the video stream is erroneous if both the first and the second conditions are fulfilled.

According to an embodiment, the unit for determining 307 is further configured to discard at least the current picture when it is determined that the video stream is erroneous. According to another embodiment, the decoder further comprises an indicating unit 305 for indicating to a user that the video stream is erroneous.

The decoder can be an HEVC decoder.

Figure 4:
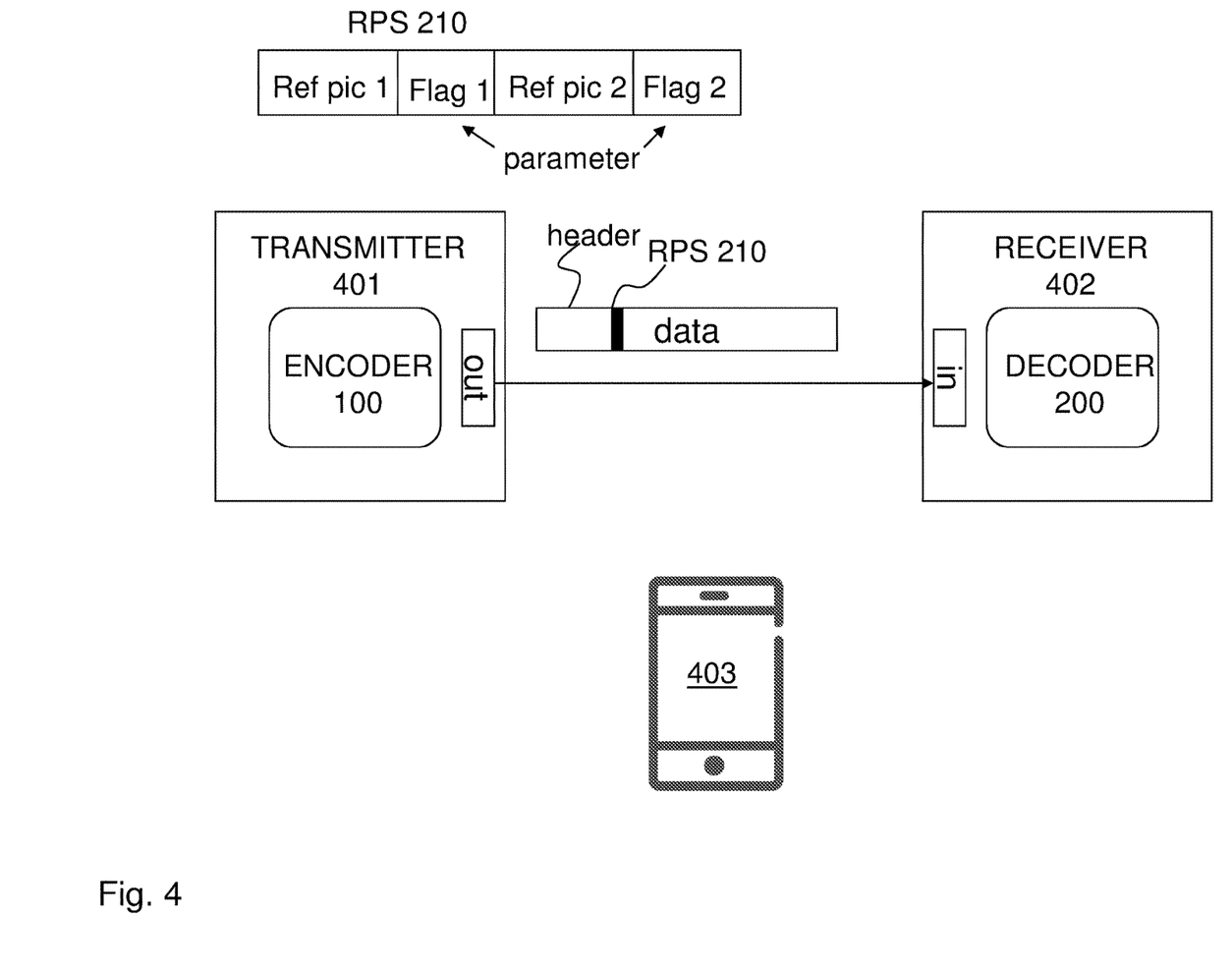
FIG. 4 illustrates a receiver and a transmitter according to an embodiment of the present invention.

As mentioned above, the embodiments can be implemented in an encoder and a decoder. The decoder can be located in any element that operates on a bitstream such as a network-node or a Media Aware Network Element (MANE). The encoder 100 can be implemented in a transmitter as illustrated in FIG. 4 and the decoder 200 can be implemented in a receiver 402. The receiver and/or the transmitter can be implemented in a set-top box, mobile device, video camera 403 etc.

The different embodiments define different ways to implement the conditions and how to indicate the syntax element.

Further, the functionalities of the encoder (and similar entity) and the decoder can be implemented by a respective processor and a memory, wherein the memory stores software code portions that can be executed by the processor to perform said functionalities.

Figure 5:
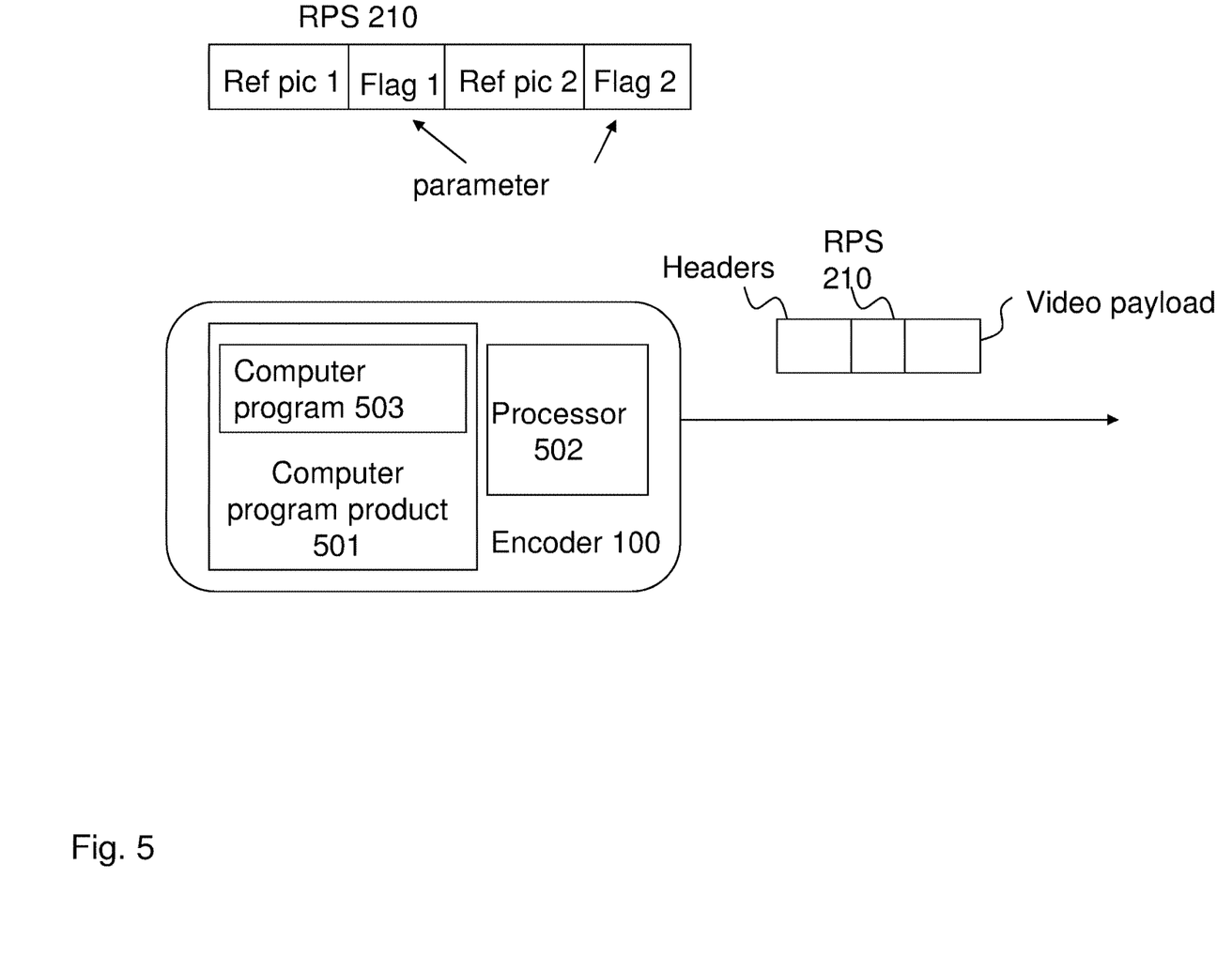
FIGS. 5 and 6 illustrate schematically an implementation of the embodiments.

With reference to FIG. 5, a computer program 503 for encoding a current picture of a video stream is provided. Previously decoded pictures are used as reference pictures for decoding and the encoder indicates in a RPS to a decoder which previously decoded pictures that are indicated as reference pictures in a decoded picture buffer of a decoder. The RPS indicates the reference pictures by a respective POC value. Said computer program 503 comprises code means which when run on a processor 502 causes said processor 502 to:

determine for each long-term picture indication i of the RPS of the current picture if there are at least two reference pictures in the DPB of a decoder with least significant bits of the POC, POC lsb, equal to POC lsb of said long-term picture indication i, and if it is determined that there is at least two reference pictures in the DPB with POC lsb equal to the POC lsb indicated for said long-term picture indication i in the RPS, set a parameter indicative of that the long-term picture indication i should use the full POC, and send the current picture and the RPS with said parameter to the decoder.

Moreover, a computer program product 501 comprising computer readable code means and a computer program 503 as mentioned stored on said computer readable code means is provided.

Figure 6:
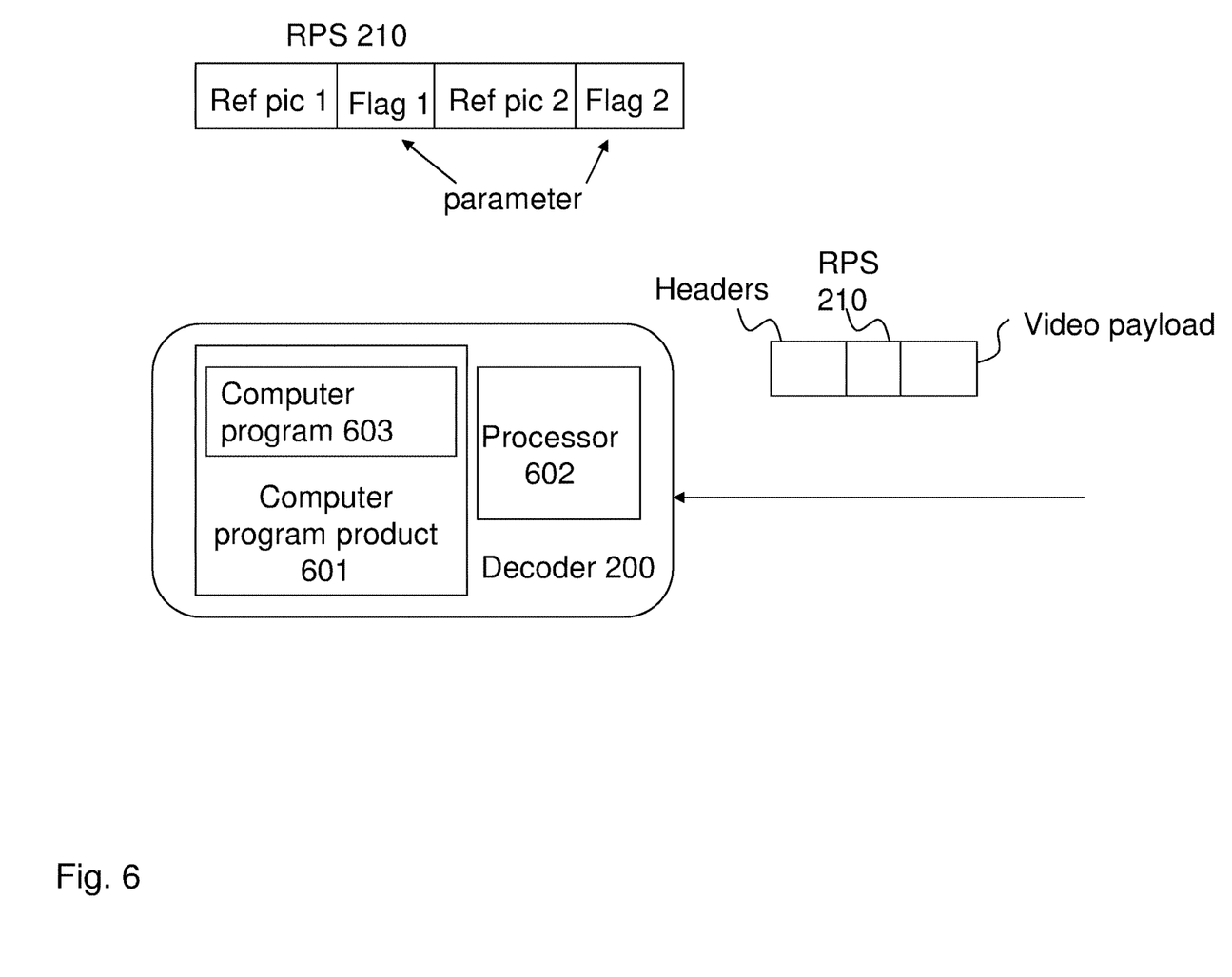

With reference to FIG. 6, a computer program 603 for decoding a current picture of a video stream is provided. Previously decoded pictures are used as reference pictures for decoding and the decoder receives an indication in a RPS from an encoder which previously decoded pictures that are indicated as reference pictures in a DPB. The RPS indicates the reference pictures by POC values. Said computer program 603 comprises code means which when run on a processor 602 causes said processor 602 to:

receive the current picture and the RPS for the current picture, receive a parameter indicative of for each long-term picture indication i in the RPS whether the long-term picture should be indicated by the full POC or by the least significant bits, lsb, of the POC, check a first condition if the received parameter indicates that the long-term picture indication i should be indicated by the lsb of the POC check a second condition if there are at least two reference pictures in the decoded picture buffer of a decoder with lsb of the POC, POC lsb, equal to POC lsb of a long-term picture indication i of the RPS of the current picture, and, if both the first and the second conditions are fulfilled: determine that the video stream is erroneous.

Further, a computer program product 601 comprising computer readable code means and a computer program 603 according to above stored on said computer readable code means is provided.

What is claimed is:

1. A method performed by an encoder for encoding a current picture of a video stream, according to a scheme in which one or more previously decoded pictures are used as reference pictures for decoding and according to which scheme the encoder indicates to a decoder, in a reference picture set (RPS), which of the one or more previously decoded pictures in a decoded picture buffer (DPB) are reference pictures, wherein the RPS indicates each of the reference pictures by a respective picture order count (POC) value and wherein each indication of a reference picture is a short-term picture indication or a long-term picture indication, said method comprising:

determining, for at least one long-term picture indicator i of the RPS of the current picture, that there are at least two reference pictures in the DPB with a least significant bit (lsb) of the POC, denoted as "POC lsb," equal to POC lsb indicated for said at least one long-term picture indicator i; and responsive to said determining, setting a parameter specifying that the at least one long-term picture indicator i be is indicated by the full POC; and sending the current picture and the RPS with said parameter to the decoder.

2. The method of claim 1, wherein said parameter is a flag.

3. The method of claim 1, wherein said parameter is a parameter delta_poc_msb_present_flag[i].

4. The method of claim 1, further comprising imposing a restriction such that a long-term picture indicator i that has been signaled with the parameter specifying that the long-term picture indicator i is indicated by the full POC will never be signaled in the future with an indicator that the long-term picture indicator i is indicated by its POC lsb.

5. The method of claim 1, wherein the encoder is a High Efficiency Video Coding (HEVC) encoder.

6. A method performed by a decoder for decoding a current picture of a video stream, wherein one or more previously decoded pictures are used as reference pictures for decoding and the decoder receives an indication from an encoder, in a reference picture set (RPS), as to which previously decoded pictures in a decoded picture buffer (DPB) are reference pictures, wherein the RPS indicates each of the reference pictures by a picture order count (POC) value and wherein each indication of a reference picture is a short-term picture indication or a long-term picture indication, wherein said method comprises:

receiving the current picture and the RPS for the current picture;

in a loop over the number of long-term picture indications for the current picture, receiving, in the RPS, a parameter for each long-term picture indication that specifies whether the long-term picture is indicated by the least significant-bit (lsb) of the POC, denoted as "POC lsb";

determining that the video stream is erroneous in response to determining that both the received parameter specifies that the long-term picture indicator i is indicated by the POC lsb and that there is more than one reference picture in the DPB with POC lsb equal to the POC lsb indicated for the long-term picture.

7. The method of claim 6, comprising the further step of discarding at least the current picture when it is determined that the video stream is erroneous.

8. The method of claim 6, comprising the further step of indicating to a user that the video stream is erroneous.

9. The method of claim 6, wherein the received parameter specifying whether the long-term picture indicator i is indicated by the full POC or by the POC lsb is a flag.

10. The method of claim 6, wherein the parameter specifying whether the long-term picture indicator i is indicated by the full POC or by the POC lsb is a parameter delta_poc_msb_present_flag[i].

11. The method of claim 6, wherein the decoder is a High Efficiency Video Coding (HEVC) decoder.

12. An encoder for encoding a current picture of a video stream, wherein the encoder is adapted to use one or more previously decoded pictures as reference pictures for encoding and the encoder is adapted to indicate to a decoder, in a reference picture set (RPS), which previously decoded pictures in a decoded picture buffer (DPB) are reference pictures, wherein the encoder is configured to indicate each of the reference pictures in the RPS by a picture order count (POC) value and wherein each indication of a reference picture is a short-term picture indication or a long-term picture indication, and wherein the encoder comprises a processor configured to:

determine, for at least one long-term picture indicator i of the RPS of the current picture, that there are at least two reference pictures in the DPB with a least significant bit (lsb) of the POC, denoted as "POC lsb," equal to POC lsb indicated for the at least one long-term picture indicator i;

set a parameter specifying that the at least one long-term picture indicator i is indicated by the full POC, in response to said determining; and send the current picture and the RPS with said parameter to the decoder.

13. The encoder of claim 12, wherein the parameter specifying that the long-term picture indicator i is indicated by the full POC is a flag.

14. The encoder of claim 12, wherein the parameter specifying that the long-term picture indicator i is indicated by the full POC is a parameter delta_poc_msb_present_flag[i].

15. The encoder of claim 12, wherein the processor is further configured to impose a restriction such that a long-term picture indicator i that has been signaled with the parameter specifying that the long-term picture indicator i is indicated by the full POC will not in the future be signaled with a parameter specifying that the long-term picture indicator i is indicated by the POC lsb.

16. A decoder for decoding a current picture of a video stream, wherein the decoder is configured to use one or more previously decoded pictures as reference pictures for decoding and wherein the decoder comprises a processor that is configured to:

receive one or more indications, in a reference picture set (RPS) from an encoder, as to which previously decoded pictures in a decoded picture buffer (DPB) are reference pictures, wherein the RPS indicates each reference picture by a picture order count (POC) value and wherein each indication of a reference picture is a short-term picture indication or a long-term picture indication;

receive the current picture and the RPS for the current picture;

in a loop over the number of long-term picture indications for the current picture, receive, in the RPS, a parameter for each long-term picture indication that specifies whether the long-term picture is indicated by the least significant-bit (lsb) of the POC, denoted as "POC lsb"; and determine that the video stream is erroneous in response to determining that both the received parameter specifies that the long-term picture indicator i is indicated by the POC lsb and that there is more than one reference picture in the DPB with POC lsb equal to the POC lsb indicated for the long-term picture.

17. The decoder of claim 16, wherein the processor is further configured to discard at least the current picture in response to determining that the video stream is erroneous.

18. The decoder of claim 16, wherein the processor is configured to indicate to a user that the video stream is erroneous.

19. The decoder of claim 16, wherein the received parameter specifying whether the long-term picture indicator i is indicated by the full POC or by the POC lsb is a flag.

20. The decoder of claim 16, wherein the parameter specifying whether the long-term picture indicator i is indicated by the full POC or by the POC lsb is a parameter delta_poc_msb_present_flag[i].

\* \* \* \* \*

UNITED STATES PATENT AND TRADEMARK OFFICE
CERTIFICATE OF CORRECTION

PATENT NO. : 12,262,042 B2
APPLICATION NO. : 18/219221
DATED : March 25, 2025
INVENTOR(S) : Sjöberg et al.

It is certified that error appears in the above-identified patent and that said Letters Patent is hereby corrected as shown below:

On the Title Page

On Page 2, item (56), under "OTHER PUBLICATIONS", in Column 2, Line 28, delete "26567," and insert -- m26567, --, therefor.

In the Drawings

In Fig. 2a, Sheet 2 of 7, for Tag "251", Line 2, delete "ref.pics" and insert -- ref pics --, therefor.

In Fig. 3, Sheet 4 of 7, for Tag "307", Line 2, delete "determiningt" and insert -- determining --, therefor.

In the Specification

In Column 2, Line 23, delete "is it" and insert -- it is --, therefor.

In Column 2, Lines 45-46, delete "delta_poc_msbscycle_lt_minus1," and insert -- delta_poc_msb_cycle_lt_minus1, --, therefor.

In Column 3, Line 7, delete "delta_poc_msb_sycle_lt_minus1" and insert -- delta_poc_msb_cycle_lt_minus1 --, therefor.

In Column 3, Line 56, delete "equal 0" and insert -- equal to 0 --, therefor.

In Column 4, Line 30, delete "POCequal" and insert -- POC equal --, therefor.

In Column 6, Line 1, delete "that that" and insert -- that --, therefor.

In Column 6, Line 9, delete "FIG." and insert -- FIGS. --, therefor.

Signed and Sealed this
Thirtieth Day of September, 2025

John A. Squires
*Director of the United States Patent and Trademark Office*

CERTIFICATE OF CORRECTION (continued)
U.S. Pat. No. 12,262,042 B2

In Column 6, Line 36, delete "DBP 150" and insert -- DPB 150 --, therefor.

In Column 6, Line 40, delete "comprises also" and insert -- also comprises --, therefor.

In Column 6, Line 61, delete "etc" and insert -- etc. --, therefor.

In Column 7, Line 15, delete "POClsbLt[i]" and insert -- POC lsbLt[i] --, therefor.

In Column 7, Line 41, delete "decoder," and insert -- decoder. --, therefor.

In Column 7, Line 47, delete "poc" and insert -- POC --, therefor.

In Column 8, Line 10, delete "constraint"" and insert -- constraint. --, therefor.

In Column 10, Line 41, delete "POC" and insert -- POC, --, therefor.

In the Claims

In Column 11, Line 4, in Claim 1, delete "i; and" and insert -- i; --, therefor.

In Column 11, Line 7, in Claim 1, delete "be is" and insert -- is --, therefor.

In Column 12, Lines 24-25, in Claim 15, delete "a long-term picture indicator" and insert -- the long-term picture indicator --, therefor.

In Column 12, Line 28, in Claim 15, delete "a parameter" and insert -- the parameter --, therefor.

In Column 12, Line 65, in Claim 19, delete "Isb" and insert -- lsb --, therefor.